US008199723B2

(12) United States Patent
Li et al.

(10) Patent No.: US 8,199,723 B2
(45) Date of Patent: Jun. 12, 2012

(54) PARALLEL WIRELESS COMMUNICATION APPARATUS, METHOD, AND SYSTEM

(75) Inventors: Qinghua Li, Sunnyvale, CA (US); Minnie Ho, Los Altos, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 2119 days.

(21) Appl. No.: 10/745,123

(22) Filed: Dec. 23, 2003

(65) Prior Publication Data
US 2005/0138199 A1 Jun. 23, 2005

(51) Int. Cl.
*H04W 4/00* (2009.01)
*H04J 3/00* (2006.01)

(52) U.S. Cl. .................. 370/334; 370/338; 370/345

(58) Field of Classification Search .................. None
See application file for complete search history.

(56) References Cited

U.S. PATENT DOCUMENTS

| 5,515,378 | A  | * | 5/1996  | Roy et al. ...................... 370/334 |
| 5,586,119 | A  | * | 12/1996 | Scribano et al. ............... 370/350 |
| 5,642,353 | A  | * | 6/1997  | Roy et al. ...................... 370/329 |
| 6,721,302 | B1 | * | 4/2004  | Alastalo ......................... 370/346 |
| 6,990,116 | B1 | * | 1/2006  | Young et al. ................... 370/445 |
| 7,046,651 | B2 | * | 5/2006  | Terry .............................. 370/338 |
| 7,352,718 | B1 | * | 4/2008  | Perahia et al. ................. 370/329 |
| 2001/0047424 | A1 | * | 11/2001 | Alastalo et al. ................ 709/236 |
| 2002/0181492 | A1 | * | 12/2002 | Kasami et al. ................. 370/445 |
| 2003/0053480 | A1 | * | 3/2003  | Jang et al. ...................... 370/445 |
| 2003/0222817 | A1 | * | 12/2003 | Gfeller et al. .................. 342/375 |
| 2003/0227914 | A1 | * | 12/2003 | Nguyen ......................... 370/386 |
| 2003/0236103 | A1 | * | 12/2003 | Tamaki et al. .............. 455/552.1 |
| 2004/0196834 | A1 | * | 10/2004 | Ofek et al. ..................... 370/352 |
| 2005/0144307 | A1 | * | 6/2005  | Li et al. .......................... 709/232 |
| 2005/0147075 | A1 | * | 7/2005  | Terry .............................. 370/338 |
| 2005/0165946 | A1 | * | 7/2005  | Stephens ........................ 709/233 |
| 2006/0029073 | A1 | * | 2/2006  | Cervello et al. ................ 370/389 |
| 2006/0153117 | A1 | * | 7/2006  | Bichot et al. ................... 370/316 |
| 2006/0153148 | A1 | * | 7/2006  | Bichot et al. ................... 370/338 |
| 2006/0187895 | A1 | * | 8/2006  | Nandagopalan ............... 370/345 |
| 2007/0104171 | A1 | * | 5/2007  | Kasami et al. ................. 370/339 |
| 2009/0310619 | A1 | * | 12/2009 | Brommer ....................... 370/449 |

FOREIGN PATENT DOCUMENTS

| EP | 0926916 A2  | 6/1999  |
| EP | 1263168 A2  | 12/2002 |
| WO | WO-0241647 A2 | 5/2002  |

OTHER PUBLICATIONS

International Search Report, Dated May 17, 2005, PCT/US2004/041902, 8 pages.
Written Opinion of the International Searching Authority, Dated May 17, 2005, PCT/US2004/041902, 7 Pages.

(Continued)

*Primary Examiner* — Clemence Han
(74) *Attorney, Agent, or Firm* — Forefront IP Lawgroup, PLLC

(57) ABSTRACT

An access point in a wireless network communicates with multiple mobile stations simultaneously using spatial-division multiple access. The access point transmits to the mobile stations frames that end at different times within a predefined window of time. When the predefined window in time is a short interframe space (SIFS) in an IEEE 802.11 compatible network, the access point will be done transmitting the frames in time to receive acknowledgements from the multiple mobile stations.

16 Claims, 8 Drawing Sheets

OTHER PUBLICATIONS

"Information Technology-Telecommunications and information exchange between systems—Local and metropolitan area networks—Specific requirements", ISO/IEC 8802-11(1999). ANSI/IEEE Std.802.11, Part 11:Wireless LAN Medium Access Control(MAC) and Physical Layer(PHY) Specifications, Chapter 9,(1999),70-97.

* cited by examiner

PARALLEL WIRELESS COMMUNICATION APPARATUS, METHOD, AND SYSTEM

FIELD

The present invention relates generally to computer networks, and more specifically to wireless networks.

BACKGROUND

Wireless networks typically include mobile stations and access points. An access point may communicate with many different mobile stations, but typically communicates with only one mobile station at a time.

DESCRIPTION OF EMBODIMENTS

Figure 1:
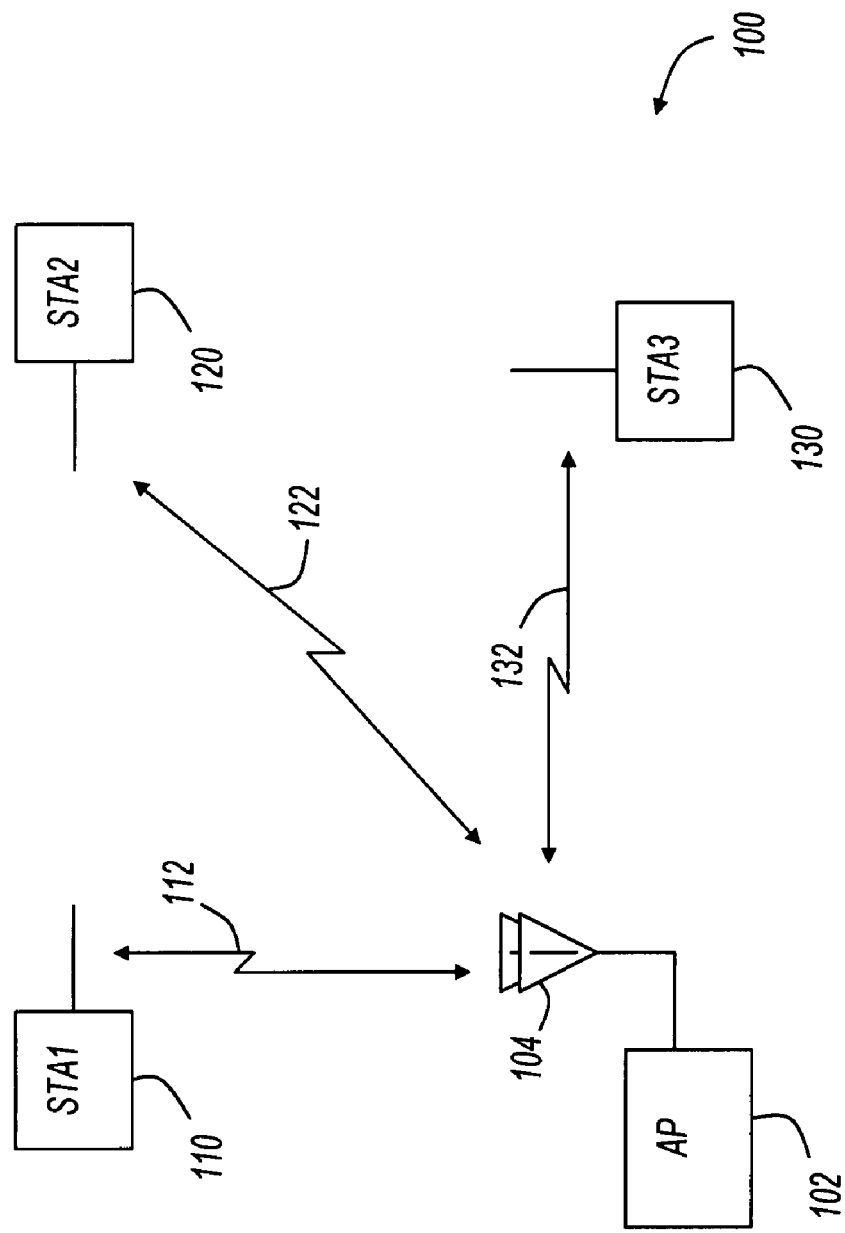
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

As explained below, in some embodiments, mobile stations 110, 120, and 130 operate in compliance with an 802.11 standard, and access point 102 is capable of maintaining simultaneous 802.11 compliant communications with multiple mobile stations. Mobile stations 110, 120, and 130 may be any type of mobile station capable of communicating in network 100. For example, the mobile stations may be computers, personal digital assistants, wireless-capable cellular phones, or the like.

Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132. When access point 102 sends signals to one or more mobile stations, this is referred to as the "downlink," and when access point 102 receives signals from one or more mobile stations, this is referred to as the "uplink." In various embodiments of the present invention, access point 102 may communicate simultaneously with multiple mobile stations on the downlink and may communicate simultaneously with multiple mobile stations on the uplink.

Access point 102 includes antennas 104. Access point 102 may be any type of access point having multiple antennas capable of communicating using spatial-division multiple access (SDMA). Spatial-division multiple access is a technique that allows multiple simultaneous independent transmissions from one wireless device that has multiple antennas to other wireless devices that may or may not have multiple antennas. For example, in some embodiments, access point 102 utilizes SDMA on the downlink to transmit to two or more of mobile stations 110, 120, or 130 simultaneously. Also for example, in some embodiments, access point 102 utilizes SDMA on the uplink to receive from two or more of mobile stations 110, 120, or 130 simultaneously. As used herein, the terms "parallel stations," "parallel group," or "parallel STAs" refer to a group of mobile stations that communicate simultaneously with access point 102.

In some embodiments of the present invention, a medium access control layer (MAC) in access point 102 controls the timing and contents of SDMA transmissions to parallel STAs. For example, a MAC in access point 102 may coordinate the timing of frames sent to multiple stations such that the frames end near in time to each other. When the multiple mobile stations respond, the MAC receives the responses, even if they overlap in time. Various embodiments of SDMA transmissions are described below with reference to FIGS. 4-9.

Spatial-division multiple access increases both user density and network throughput of wireless systems by utilizing spatial channels in the environment. For example, multiple spatial channels may be formed by a combination of the signal path(s) and the antenna patterns between an AP and multiple STAs.

In some embodiments, access point 102 may use zero-forcing beamformers for both downlink and uplink of signals to achieve SDMA. The zero-forcing beamformer is a known technique for SDMA interference cancellation using known channel state information. In some embodiments, channel state information is gathered by access point 102 during a prior uplink packet reception. Various embodiments of gathering state information, also referred to as "estimating spatial channels," is described below with reference to FIGS. 2 and 3.

Figure 2:
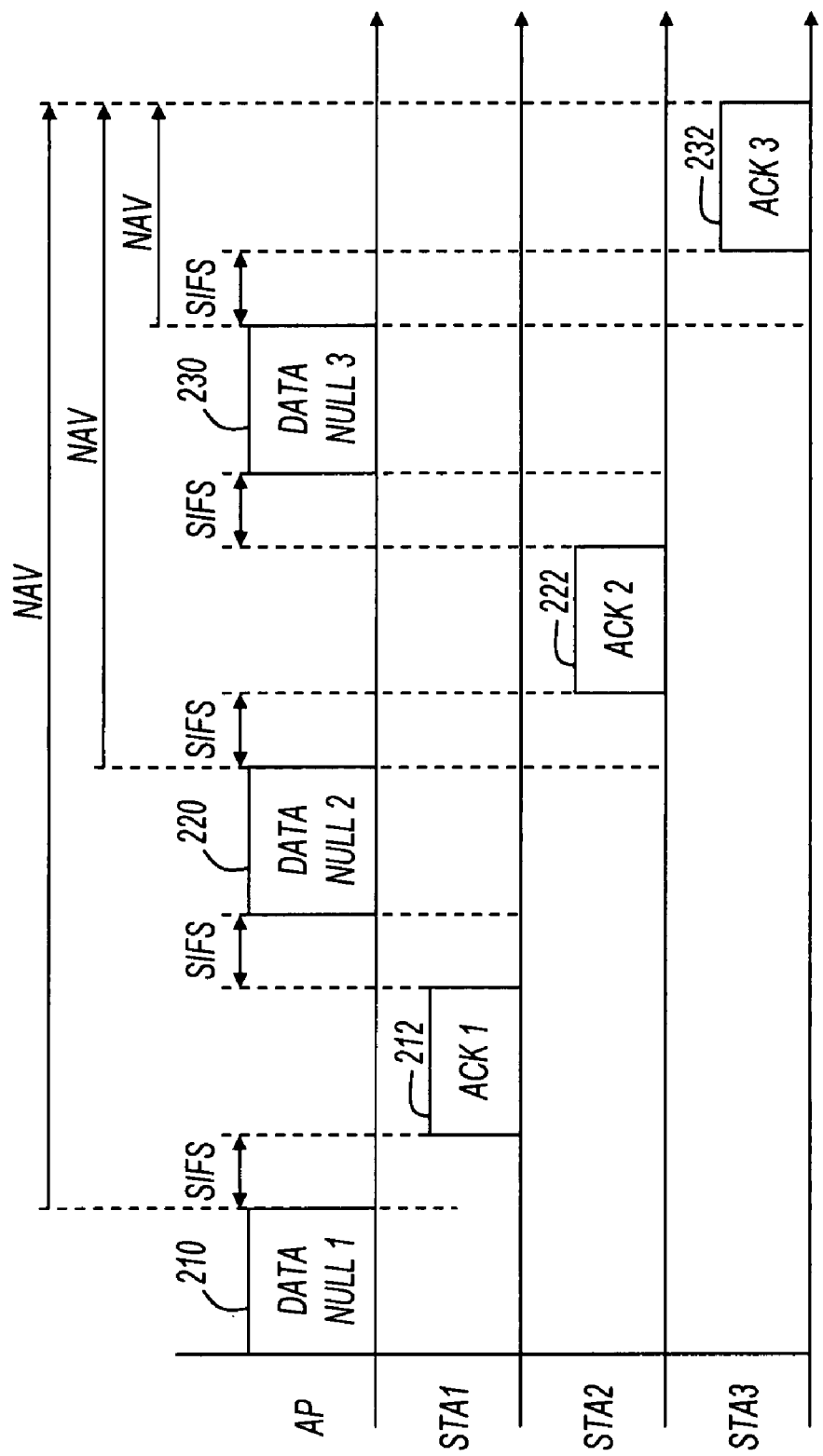
FIGS. 2 and 3 show frame sequences to estimate channel state information of communications channels.
Figure 3:
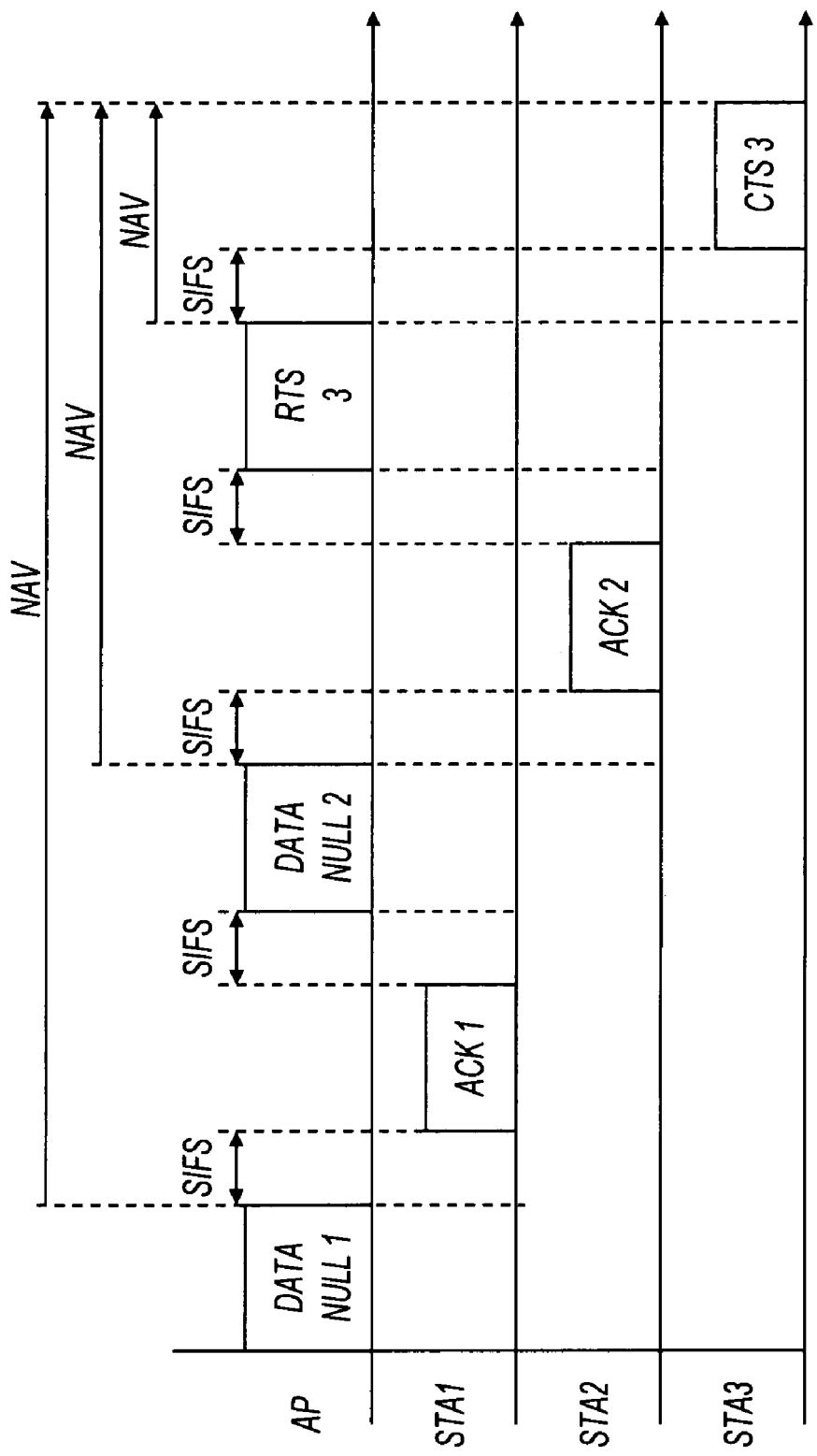

FIGS. 2 and 3 show frame sequences to estimate channel state information of communications channels. In some embodiments, channel state information of all STAs in a parallel group may be obtained before SDMA transmission and reception. Referring now to FIG. 2, an AP sends short frames and forces STAs to send back short frames. As shown in FIG. 2, in some embodiments, an AP sends IEEE 802.11 Null-data frames in turn to STAs and estimates the STAs' channels from the received acknowledgement (ACK) frames. For example, as shown in FIG. 2, the AP sends a Null-data frame 210 to STA1, which returns ACK frame 212; the AP sends Null-data frame 220 to STA2, which returns ACK frame 222; and the AP sends Null-data frame 230 to STA3, which returns ACK frame 232. Embodiments represented by FIG. 2 may be employed after channel access using either point coordination function (PCF), or distributed coordination function (DCF) of an 802.11 MAC protocol, but the invention is not limited in this respect. In some embodiments, transmission of Null-data frames may have the side effect of setting the NAV of all STAs in range because the Null-data frames may be transmitted using nominally omni-directional antenna patterns In some embodiments, frames other than Null-data frames and ACK frames are utilized to estimate spatial channels. For example, in some embodiments, frames such as IEEE 802.11 request-to-send (RTS) and clear-to-send (CTS) frames are utilized to estimate spatial channels. In some embodiments, RTS and CTS frames are sent following channel access using the DCF of an 802.11 MAC protocol. Regardless of the type of frame utilized, the network-allocation-vector (NAV) may be set to the end of the last ACK or CTS to prevent an unintended STA from acquiring the medium during the SDMA training process. Whenever an AP loses channel information of a STA, it can employ various embodiments of spatial channel estimation to update channel information. Many different possible frame types may be utilized to estimate spatial channels without departing from the scope of the present invention.

Referring now to FIG. 3, an AP utilizes a combination of Null-data frames and RTS frames to force STAs to send back short frames. In embodiments represented by FIG. 3, the final Null-data frame may be replaced with an RTS frame (which solicits a CTS response). In some embodiments, this may have the side effect of setting the NAV of all STAs in range because the RTS and CTS may both be transmitted using nominally omni-directional antenna patterns.

FIGS. 4-7 show SDMA frame sequences that correspond to parallel communications using the IEEE 802.11 point coordination function (PCF). In some embodiments, frames sent using PCF are sent during a contention-free (CF) period. During the contention-free period, STAs cannot initiate frame exchange sequences because their NAV timer prevents channel access using DCF. They transmit only in two cases: a STA transmits an acknowledgement frame (ACK) after receiving a data (or messaging) frame directed to it; and a STA transmits after receiving a frame with a contention-free-poll (CF-Poll). In other words, STAs transmit during a contention-free period only if the AP solicits a response. The STAs may include polled, unpolled, pollable, and unpollable STAs.

Figure 4:
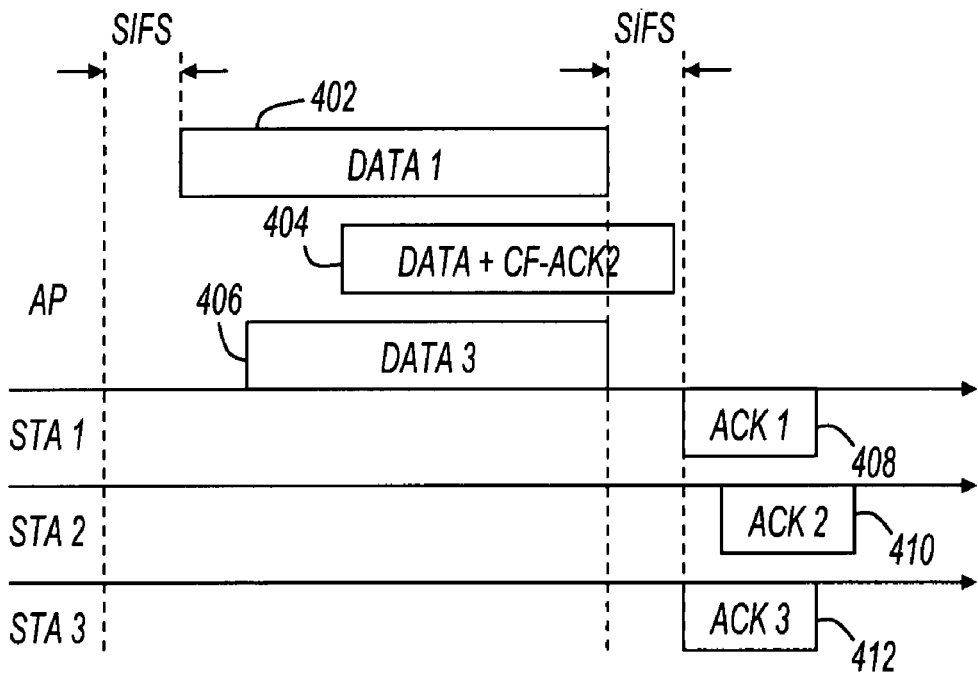
FIGS. 4-9 show spatial-division multiple access download frame sequences.

Referring now to FIG. 4, an AP sends Data frames or Data+CF-Ack frames to parallel STAs using SDMA and then switches to receive mode to receive ACKs from the STAs in parallel using SDMA. For example, the AP sends Data frame 402 to STA1, Data+CF-Ack frame 404 to STA2, and Data frame 406 to STA3. In some embodiments, the multiple frames sent simultaneously on the downlink are coordinated in time such that they all end within a predetermined time window. For example, as shown in FIG. 4, frames 402, 404, and 406 all end within a predetermined time window equal to one IEEE 802.11 short interframe spacing (SIFS). In some embodiments, the predetermined time window is greater than or less than one SIFS. For example, in some embodiments, the predetermined time window is substantially equal to a short-interframe spacing (SIFS) period plus 10% of a slot time.

In response to the frames send to the STAs, the STAs transmit ACK frames back to the AP. For example, STA1 transmits ACK frame 408; STA2 transmits ACK frame 410; and STA3 transmits ACK frame 412. Although as shown in FIG. 4 STA2 may hear STA1's transmission of ACK, STA2 will still transmit its ACK since an 802.11 compliant STA will send an ACK (or CF-ACK) regardless of the channel idle/busy status.

By utilizing SDMA, the AP is able to transmit information in different spatial channels to parallel STAs simultaneously. Further, the AP is able to receive information from parallel STAs simultaneously using separate spatial channels. As shown in FIG. 4, the parallel transmissions are ended prior to an expected start time of the first response. In general, the parallel transmissions all end in a window in time having a width that is related to the short interframe spacing (SIFS).

Figure 5:
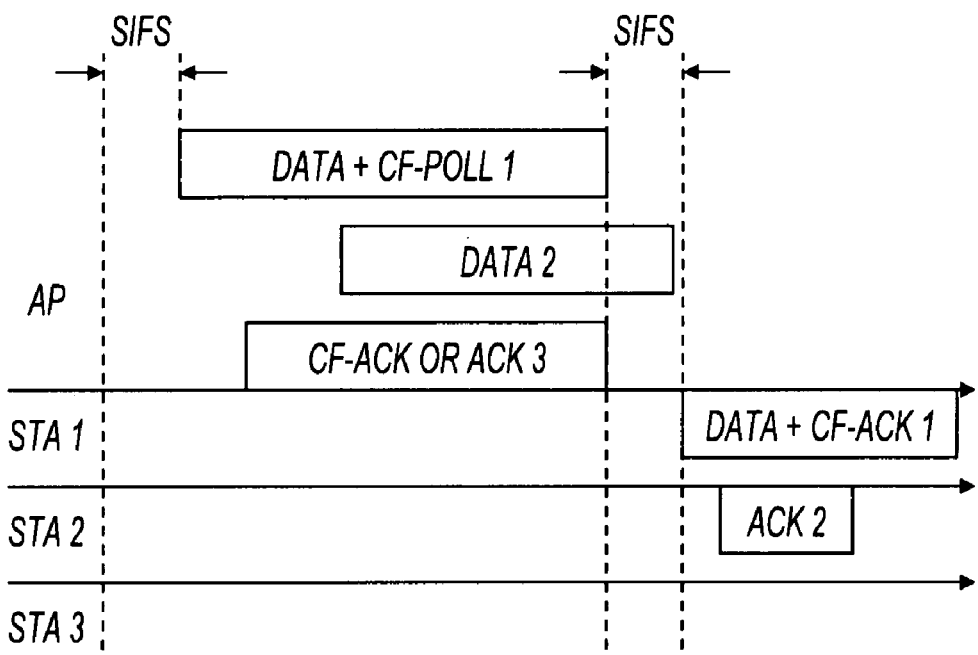

Referring now to FIG. 5, the AP sends multiple frames of the following IEEE 802.11 types: Data, Data+CF-ACK, ACK, or CF-ACK frames. Further, in some embodiments, the AP may add a single CF-Poll in the frames to ask for data from one STA. If the CF-ACK is added, one of the frames, i.e., Data+CF-ACK, Data+CF-ACK+CF-Poll, CF-ACK+CF-Poll may be sent in the parallel group of transmissions. The downlink sequences shown in FIGS. 4 and 5 generally do not cause retransmissions in the uplinks. In contrast, the downlink sequence in FIG. 6, described below, may cause retransmission in the uplink.

Figure 6:
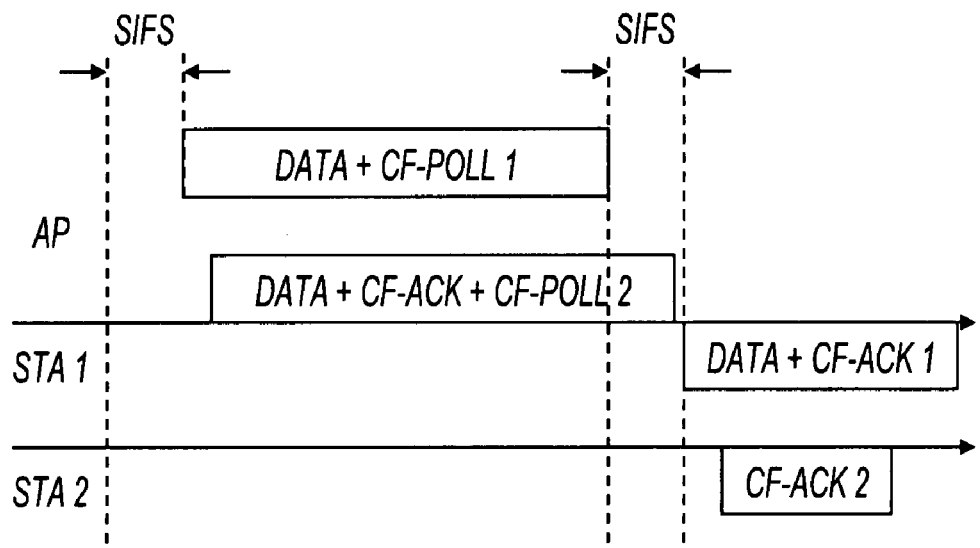

Referring now to FIG. 6, the AP sends Data frames along with multiple CF-Polls in the parallel group of transmissions to ask for uplink traffic. The timing relationships are the same as that described above with reference to FIG. 4. If the termination time instances of the uplink frames from multiple STAs that require acknowledgments are within a time window, (e.g., one SIFS period plus 10% of a slot time), the AP doesn't cause retransmission in the uplink. In some embodiments, only those uplink frames requesting an acknowledgement matter to the time window. If the termination time instances spread over the time window, then the AP still receives the acknowledgements from the STAs, but it may not acknowledge the received uplink Data frames in time. If the AP sends out the acknowledgements late, it may cause retransmission in the uplink depending on the ACKTimeout implementation on the STAs. The specific example shown in the FIG. 6 does not cause uplink retransmission.

Figure 7:
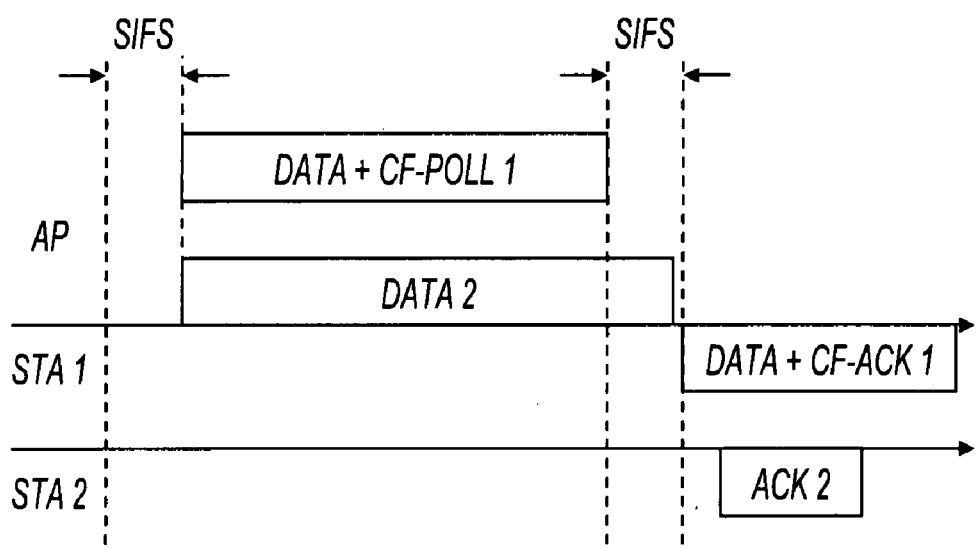

Referring now to FIG. 7, an example is shown where efficiency is improved by sending data in the guard gap, (e.g., one SIFS period). In this example, the AP knows that STA1 has data to send and that STA2 hasn't data to send. This information may be retrieved from the more-data fields of frames previously received. The AP predicts that the uplink transmission of STA1 should be longer than the one of STA2. So, the AP sends more data to STA 2 than to STA1 to exploit the guard gap between transmission and reception of STA1's data.

Figure 8:
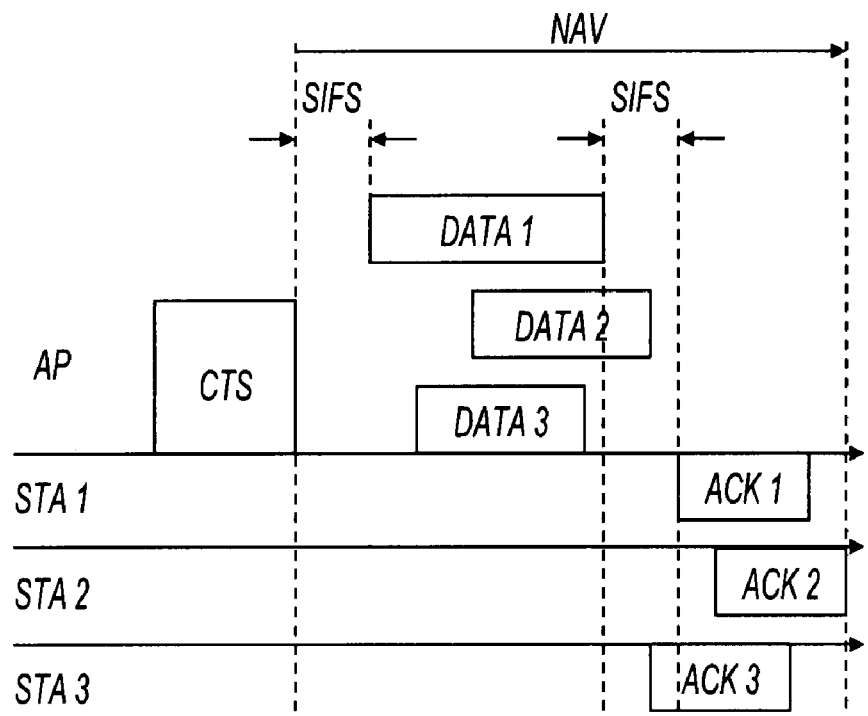
Figure 9:
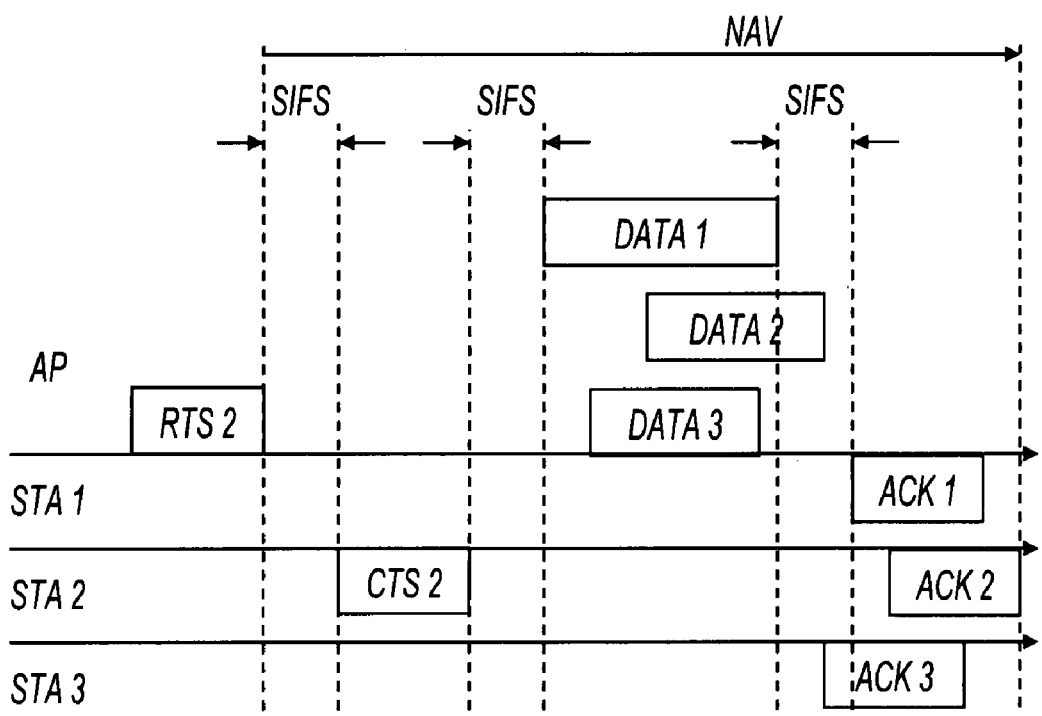

The frame sequences shown in FIGS. 8 and 9 correspond to parallel communications using distributed coordination function (DCF). The AP sets the network-allocation-vector (NAV) of all STAs in the vicinity to prevent unintended STAs from interfering with the beamformed signals. The NAV can be set by transmission of RTS or CTS frames using nominally omni-directional radiation antennas. FIG. 8 shows the AP setting the NAV using a broadcast CTS frame, and FIG. 9 shows the AP setting the NAV using a unicast RTS frame addressed to one of the STAs in its parallel group. As in the previous figures, the termination times of the parallel frames are coordinated to end in a time window. In some embodiments, the time window is related to a short interframe spacing (SIFS), and in some embodiments, the time window is substantially equal to a short-interframe spacing (SIFS) period plus 10% of a slot time.

Figure 10:
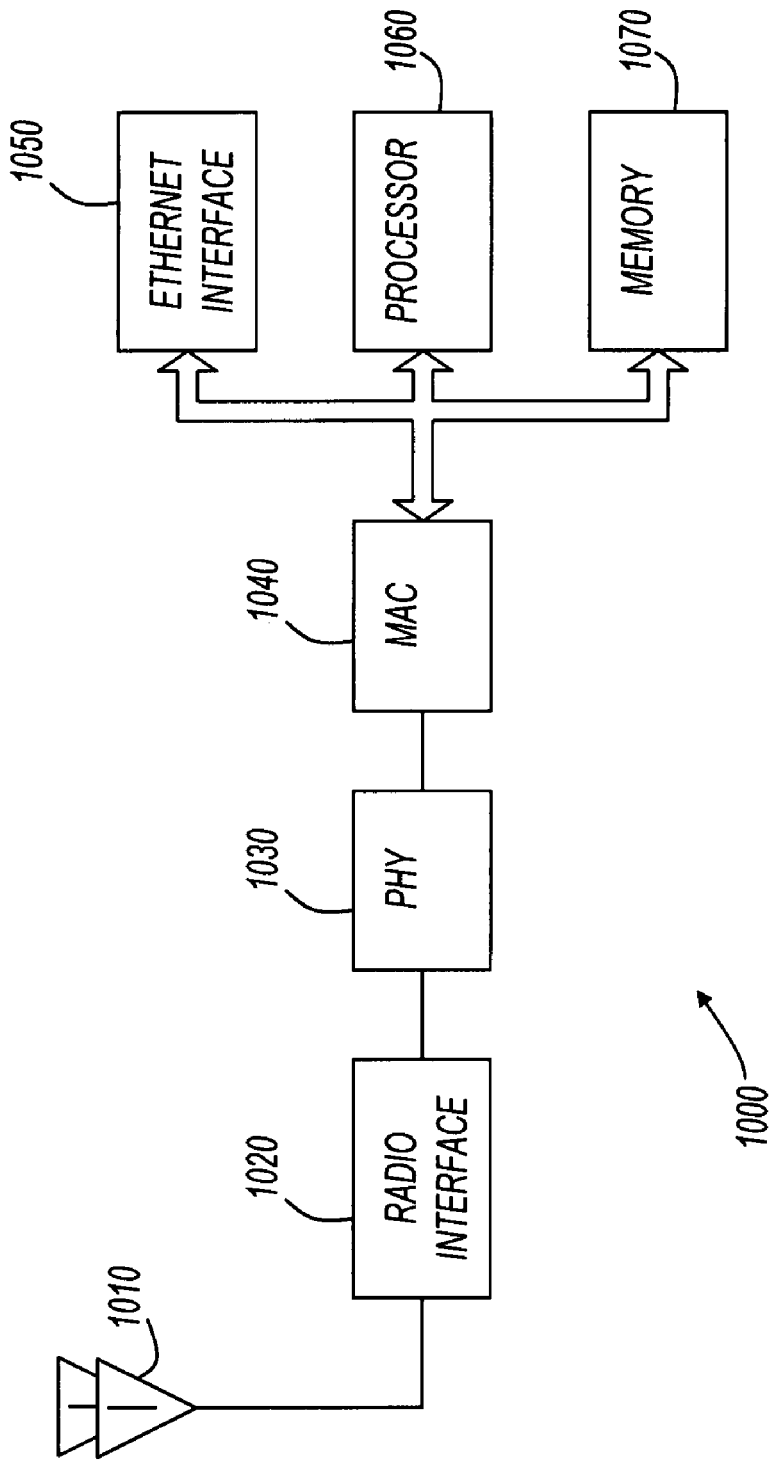
FIG. 10 shows a system diagram in accordance with various embodiments of the present invention.

FIG. 10 shows a system diagram in accordance with various embodiments of the present invention. Electronic system 1000 includes antennas 1010, radio interface 1020, physical layer (PHY) 1030, media access control (MAC) mechanism 1040, Ethernet interface 1050, processor 1060, and memory 1070. In some embodiments, electronic system I 000 may be an access point that can communicate in parallel with multiple 802.11 compliant mobile stations. For example, electronic system 1000 may be utilized in network 100 as access point 102. Also for example electronic system 1000 may be an access point capable of communicating with mobile stations using frame sequences shown in the previous figures.

In some embodiments, electronic system 1000 may represent a system that includes an access point as well as other circuits. For example, in some embodiments, electronic system 1000 may be a computer, such as a personal computer, a workstation, or the like, that includes an access point as a peripheral or as an integrated unit. Further, electronic system 1000 may include a series of access points that are coupled together in a network.

In operation, system 1000 sends and receives signals using antennas 1010, and the signals are processed by the various elements shown in FIG. 10. Antennas 1010 may be an antenna array or any type of antenna structure that supports SDMA.

Radio interface 1020 is coupled to antennas 1010 to interact with a wireless network. Radio interface 1020 may include circuitry to support the transmission and reception of radio frequency (RF) signals. For example, in some embodiments, radio interface 1020 includes an RF receiver to receive signals and perform "front end" processing such as low noise amplification (LNA), filtering, frequency conversion or the like. Further, in some embodiments, radio interface 1020 includes beamforming circuitry to support SDMA processing. Also for example, in some embodiments, radio interface 1020 includes circuits to support frequency up-conversion, and an RF transmitter. The invention is not limited by the contents or function of radio interface 1020.

Physical layer (PHY) 1030 may be any suitable physical layer implementation. For example, PHY 1030 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM).

Media access control (MAC) mechanism 1040 may be any suitable media access control layer implementation. For example, MAC 1040 may be implemented in software, or hardware or any combination thereof. In some embodiments, a portion of MAC 1040 may be implemented in hardware, and a portion may be implemented in software that is executed by processor 1060. Further, MAC 1040 may include a processor separate from processor 1060. MAC 1040 may implement any of the parallel communications embodiments of the present invention. For example, MAC 1040 may provide frames and their coordinated timing to achieve parallel communications using SDMA.

Figure 11:
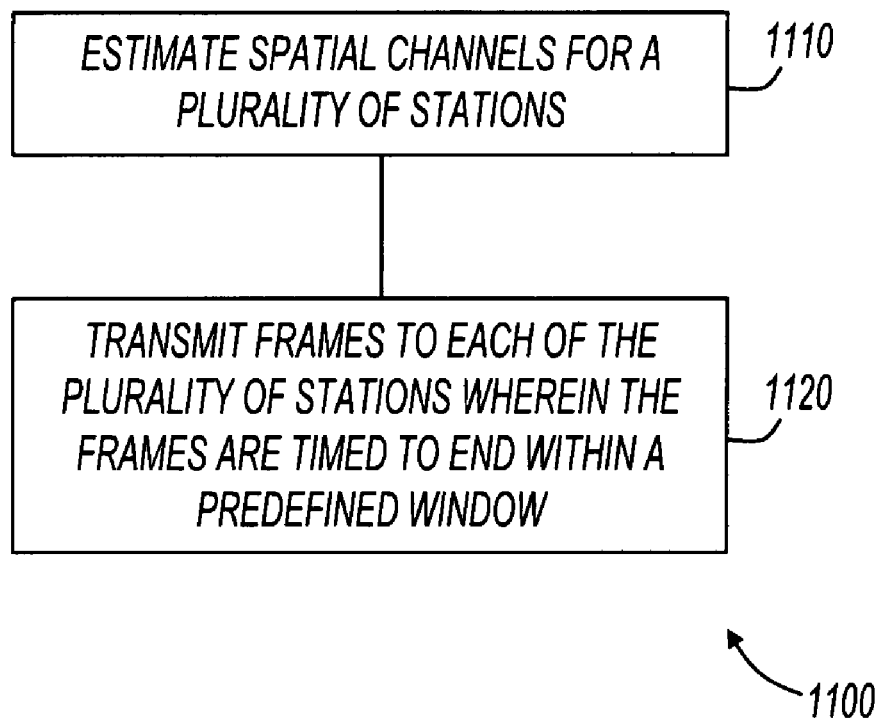
FIG. 11 shows a flowchart in accordance with various embodiments of the present invention.

Processor 1060 may perform method embodiments of the present invention, such as method 1100 (FIG. 11). Processor 1060 represents any type of processor, including but not limited to, a microprocessor, a digital signal processor, a microcontroller, or the like.

Memory 1070 represents an article that includes a machine readable medium. For example, memory 1070 represents a random access memory (RAM), dynamic random access memory (DRAM), static random access memory (SRAM), read only memory (ROM), flash memory, or any other type of article that includes a medium readable by processor 1060.

Memory 1070 may store instructions for performing the execution of the various method embodiments of the present invention.

Ethernet interface 1050 may provide communications between electronic system 1000 and other systems. For example, in some embodiments, electronic system 1000 may be an access point that utilizes Ethernet interface 1050 to communicate with a wired network or to communicate with other access points. Some embodiments of the present invention do not include Ethernet interface 1050. For example, in some embodiments, electronic system 1000 may be a network interface card (NIC) that communicates with a computer or network using a bus or other type of port.

FIG. 11 shows a flowchart in accordance with various embodiments of the present invention. In some embodiments, method 1 100 may be used to communicate with parallel mobile stations using SDMA. In some embodiments, method 1100, or portions thereof, is performed by an access point, a processor, or an electronic system, embodiments of which are shown in the various figures. Method 1100 is not limited by the particular type of apparatus, software element, or system performing the method. The various actions in method 1100 may be performed in the order presented, or may be performed in a different order. Further, in some embodiments, some actions listed in FIG. 11 are omitted from method 1100.

Method 1100 is shown beginning at block 1110 in which an access point estimates spatial channels for a plurality of stations. In some embodiments, this corresponds to sending frames to each of the plurality of stations in turn, and receiving frames back. For example, referring now back to FIG. 2, null-data frames may be sent, and ACK frames may be received. Also for example, referring now back to FIG. 3, an RTS frame may be sent and a CTS frame may be received. In some embodiments, each spatial channel is estimated from the received frames.

At 1120, frames are transmitted to each of the plurality of stations wherein the frames are timed to end within a predefined window. In some embodiments, the frames have a format compatible with an IEEE 802.11 standard. The frames may be sent using point coordination function (PCF) or distributed coordination function (DCF). Any type of suitable frame may be transmitted, including but not limited to, RTS, CTS, polling frames, and non-polling frames. The length of the predefined window may be related to the length of a short interframe space (SIFS) or other space., For example, in some embodiments, the predefined window may be substantially equal to a SIFS plus 10% of a slot time.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   transmitting omnidirectionally to a plurality of stations;
   receiving acknowledgments from the plurality of stations;
   estimating spatial channels from the acknowledgements;
   predicting that an uplink transmission of one of the plurality of stations should be longer than a second of the plurality of stations; and
   sending data frames simultaneously to the plurality of stations using spatial division multiple access (SDMA) through separate spatial channels, wherein the frames are coordinated to end at different times within a short interframe space of each other, wherein more data is sent to the second of the plurality of stations.

2. The method of claim 1 wherein the data frames have a format compatible with an IEEE 802.11 standard.

3. The method of claim 2 wherein transmitting omnidirectionally comprises sending a clear-to-send frame.

4. The method of claim 3 wherein sending a clear-to-send frame comprises setting a network allocation vector.

5. The method of claim 1 wherein sending data frames to a plurality of stations is performed as part of a distributed coordination function.

6. The method of claim 1 wherein sending data frames to a plurality of stations is performed as part of a point coordination function.

7. A method comprising;
transmitting omnidirectionally to a plurality of stations;
receiving acknowledgments from the plurality of stations;
estimating spatial channels from the acknowledgements;
predicting that an uplink transmission of one of the plurality of stations should be longer than a second of the plurality of stations; and
sending data frames simultaneously to the plurality of stations using spatial division multiple access (SDMA), wherein the data frames are coordinated to end within a predefined window in time, wherein the predefined window in time is related to a short interframe space and wherein the predefined window in time is equal to said short interframe space plus ten percent of a slot time, wherein separate spatial channels are used to receive and transmit from and to the plurality of stations, wherein more data is sent to the second of the plurality of stations.

8. The method of claim 7 wherein transmitting omnidirectionally comprises sending a request-to-send frame using an omni-directional antenna pattern.

9. The method of claim 7 wherein transmitting omnidirectionally comprises sending a clear-to-send frame using an omni-directional antenna pattern.

10. An apparatus having a non-transitory machine-readable medium with instructions stored thereon that when accessed, result in a machine performing:
transmitting omnidirectionally to a plurality of stations through separate spatial channels;
receiving acknowledgments from the plurality of stations through the separate spatial channels;
estimating spatial channels from the acknowledgements;
predicting that an uplink transmission of one of the plurality of stations should be longer than a second of the plurality of stations; and
sending data frames simultaneously to the plurality of stations using spatial division multiple access (SDMA), wherein the data frames are coordinated to end at different times within a short interframe space of each other, wherein more data is sent to the second of the plurality of stations.

11. The apparatus of claim 10 wherein transmitting omni-directionally comprises sending a clear-to-send frame.

12. The apparatus of claim 11 wherein sending a clear-to-send frame comprises setting a network allocation vector.

13. An apparatus having a non-transitory machine-readable medium with instructions stored thereon that when accessed, result in a machine performing:
transmitting omnidirectionally to a plurality of stations through separate spatial channels;
receiving acknowledgments from the plurality of stations through the separate spatial channels;
estimating spatial channels from the acknowledgements;
predicting that an uplink transmission of one of the plurality of stations should be longer than a second of the plurality of stations; and
sending data frames simultaneously to the plurality of stations using spatial division multiple access (SDMA), wherein the data frames are coordinated to end within a predefined window in time;
wherein the predefined window in time is related to a short interframe space and wherein the predefined window in time is equal to said short interframe space plus ten percent of a slot time, and more data is sent to the second of the plurality of stations.

14. An electronic system comprising:
a plurality of antennas to provide spatial-division multiple access;
a radio interface coupled to the plurality of antennas; and
a medium access control mechanism to transmit omnidirectionally to a plurality of mobile stations, to receive acknowledgements form the plurality of mobile stations, to estimate spatial channels, predict that an uplink transmission of one of the plurality of the mobile stations should be longer than a second of the plurality of stations, and to send data frames simultaneously to the plurality of mobile stations using spatial division multiple access (SDMA), wherein the data frames are timed to end at different times within a short interframe space, wherein separate spatial channels are used to transmit and receive information and more data is sent to the second of the plurality of stations.

15. The electronic system of claim 14 wherein the medium access control mechanism comprises a processor.

16. An electronic system comprising:
a plurality of antennas to provide spatial-division multiple access;
a radio interface coupled to the plurality of antennas; and
a medium access control mechanism to transmit omnidirectionally to a plurality of mobile stations, to receive acknowledgements from the plurality of mobile stations, to estimate spatial channels, predict that an uplink transmission of one of the plurality of the mobile stations should be longer than a second of the plurality of stations and to send data frames simultaneously to the plurality of mobile stations using spatial division multiple access, wherein the data frames are timed to end within a window in time;
wherein the data frames are timed to end within one short interframe space plus one tenth of a slot time of each other, and separate spatial channels are used to transmit and receive information and more data is sent to the second of the plurality of stations.

* * * * *